2 Sheets—Sheet 1.
F. L. POPE,
Assignor to himself, S. C. HENDRICKSON, J. N. ASHLEY, and J. D. LINCOLN.
Electric Railway-Signal
No. 8,044. Reissued Jan. 22, 1878.
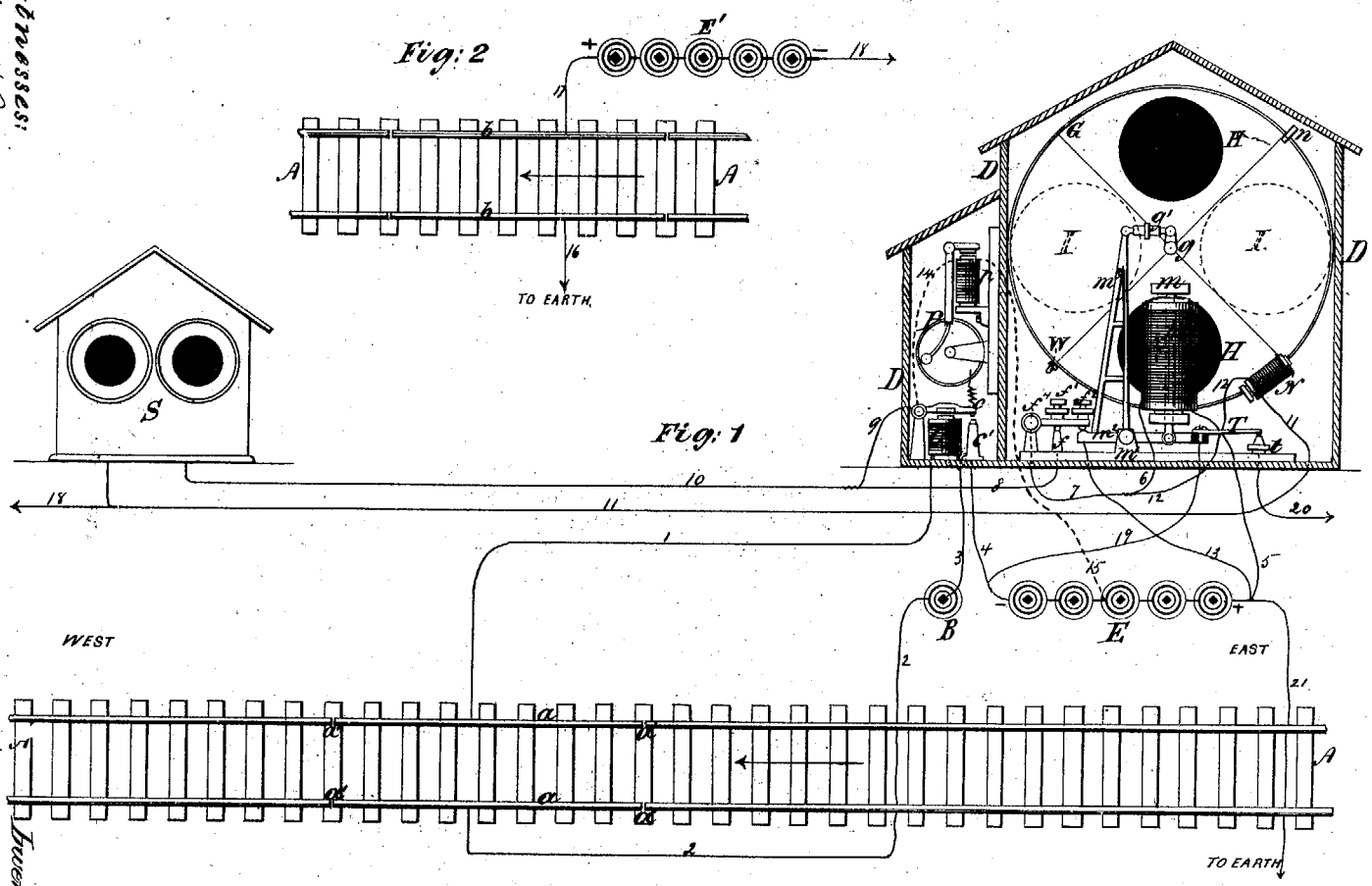
Witnesses:
Edward H. Brown.
A. J. De Lacy.
Inventor
Frank L. Pope.
THE NORRIS PETERS CO., WASHINGTON, D.C.

2 Sheets—Sheet 2.
F. L. POPE,
Assignor to himself, S. C. HENDRICKSON, J. N. ASHLEY, and J. D. LINCOLN.
Electric Railway-Signal.
No. 8,044. Reissued Jan. 22, 1878.
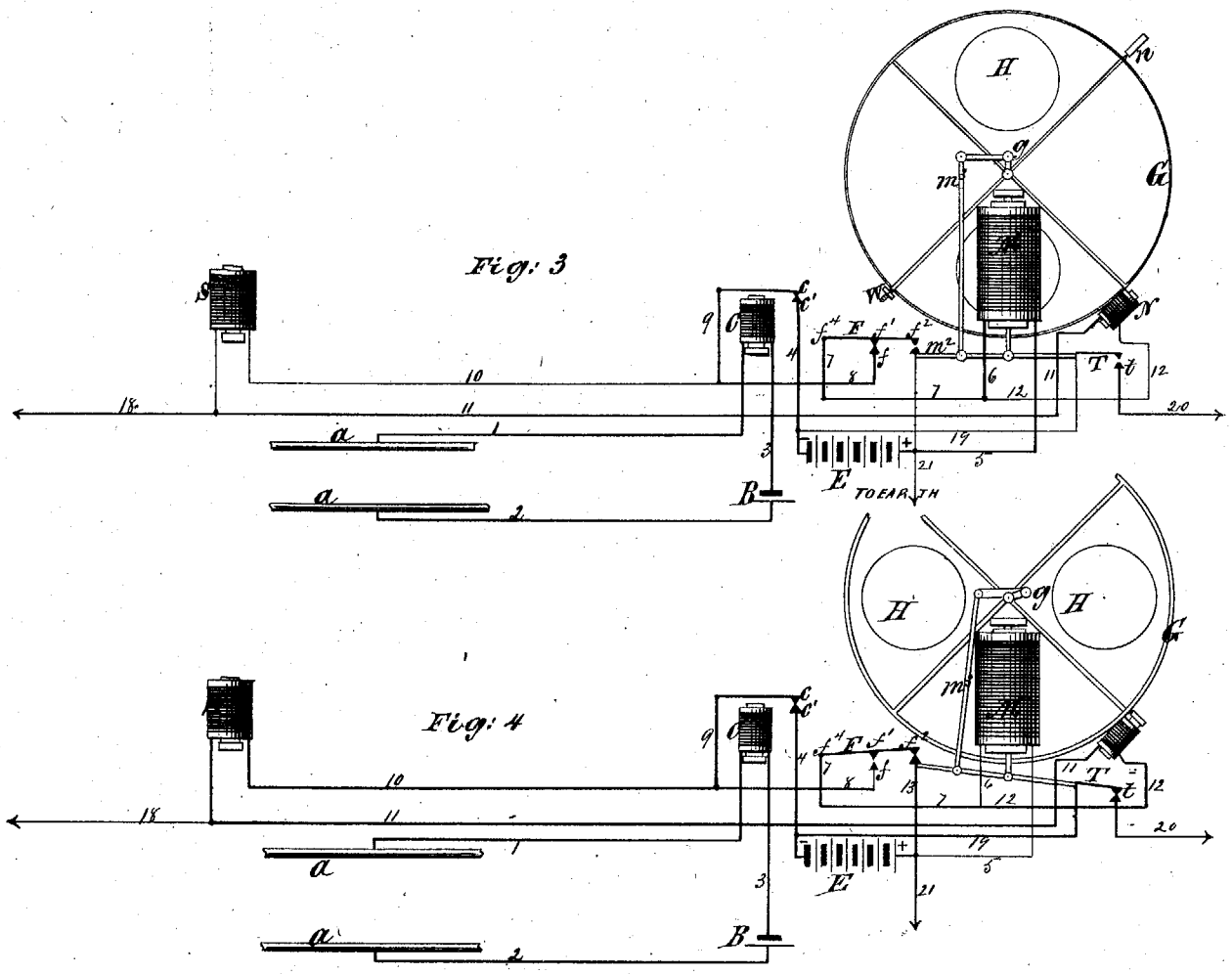
*Witnesses:*
Edwin H. Brown.
A. J. De Lay.
*Inventor:*
Frank L. Pope
THE NORRIS PETERS CO., WASHINGTON, D. C.

UNITED STATES PATENT OFFICE.

FRANK L. POPE, OF ELIZABETH, N. J., ASSIGNOR TO HIMSELF, STEPHEN C. HENDRICKSON, JAMES N. ASHLEY, AND JAMES D. LINCOLN.

IMPROVEMENT IN ELECTRIC RAILWAY-SIGNALS.

Specification forming part of Letters Patent No. 149,152, dated March 31, 1874; Reissue No. 8,044, dated January 22, 1878; application filed December 4, 1874.

DIVISION A.

*To all whom it may concern:*

Be it known that I, FRANK L. POPE, of Elizabeth, in the county of Union and State of New Jersey, have invented certain new and useful Improvements in Electric Signaling Apparatus for Railroads; and I hereby declare that the following is a full, clear, and exact description thereof, reference being had to the accompanying drawing, which forms part of this specification.

My invention relates to certain improvements in electric signaling apparatus for railroads, and means of operating the same, for which United States Letters Patent No. 129,125 were granted to me July 16, 1872.

The object of my present invention is to so arrange a series of semaphoric and audible signals actuated by electro-magnetism at intervals along the line of a railroad that each of the said signals will be automatically exhibited or sounded by the passage of a train, and will remain visible or audible until the train is under the protection of the next succeeding signal, when the first-mentioned signal will be withdrawn or reversed, by which means one train following another upon the same track may be cautioned, and thus prevented from approaching too closely to the preceding train or coming in collision with it.

My invention consists in certain improved methods of combining and arranging the circuit-closers, wires, batteries, signals, and signal mechanism, whereby greater efficiency and economy of operation are secured.

In the accompanying drawing, Figure 1 is a general view, showing a primary and a secondary signal, and also their electrical connections with each other and with the railroad-track, the box or case inclosing the primary signal being shown in section. Fig. 2 is a detached view, showing the manner in which the battery for releasing or reversing the primary signal may be connected with the railroad-track. Figs. 3 and 4 are diagrams, showing the electrical connections within the apparatus corresponding with the two different positions of the primary signal.

A A represent a portion of the line of a railroad. A short section, *a a*, of the track is insulated from metallic contact with the remainder by spaces *a' a' a' a'*, or otherwise. The two rails *a a*, when bridged by the wheels and axles of a passing locomotive or car, complete an electric circuit, which includes the wires 1, 2, and 3, the battery B, and the helices of the relay C, so that during the passage of a locomotive or train over the insulated section of track *a a*, which forms a circuit-closer for the primary circuit, the relay C will continuously close a secondary circuit for a sufficient length of time to allow a signal-disk to be moved into position by its action by bringing the lever *c* into contact with the post *c'*, in a manner well understood. The relay C is placed in a compartment of the box or case D, which also contains the machinery of the primary signal. The box or case D is mounted upon a suitable support above or alongside the track, and is supposed to be situated at the distance of not less than an ordinary train's length in the rear of the track-circuit closer *a a*. Thus in Fig. 1 the trains are supposed to move from east to west, in the direction indicated by the arrow. The case D, containing the primary signal and its attachments, should be placed at least a train's length east of the point *a a*, for reasons hereinafter to be explained.

When the relay-lever *c* is brought in contact with the post *c'*, a secondary circuit is closed, which includes the wire 4, battery E, wire 5, electro-magnet M, wires 6 and 7, lever F, screw $f^1$, post *f*, and wires 8 and 9. The course of the primary and secondary circuits is plainly shown by the heavy lines in Fig. 3. When the circuit is closed at *c c'*, the electro-magnet M becomes charged and attracts the armature *m*, which is attached by means of a rod (shown by dotted lines) to the lever $m^2$, having its fulcrum at $m^1$. A rigid arm, $m^3$, fixed to this lever, revolves the signal-disk G by means of the crank *g* and pitman *g'*, as more fully explained in my former patent of August 27, 1872, No. 130,941.

In my present invention, however, I prefer to make use of a single disk, G, having two targets, H H, of some suitable strongly-contrasting color, arranged upon it in such a manner that one-fourth of a complete revolution of the disk G will cause the targets H H to be displayed through circular openings I I in the case D. (Indicated by the dotted lines.)

It will therefore be understood, without further explanation, that when the electro-magnet M is charged the armature *m* will be attracted and the disk G turned through the distance of one-fourth of a revolution, thereby displaying the targets H H of the signal through the openings I I.

In order to move the signal-disk G in a prompt and effective manner by means of an electro-magnet, it is necessary to construct it of very light and thin material, such as cloth or paper stretched over a hoop. It is also necessary to inclose it on all sides with a case, D D, provided with suitable openings I I, as hereinbefore explained, through which the signals are exhibited. These openings should be covered by glass.

The object of this arrangement is to prevent currents of air from interfering with the movement of the signal, so that a much smaller battery-power is required than would be necessary if the signal were exposed to the action of the wind.

S is a secondary signal, which may be of any suitable construction. It is also inclosed in a suitable case, and actuated by an electro-magnet, and it is so arranged that when in its normal condition a color indicating "danger" or "caution" will be exhibited; but whenever the actuating-magnet is charged the color will be changed so as to indicate "safety." For example, the normal color exhibited may be green, but the electro-magnet, when charged, may exhibit a white signal. When the circuit is broken the green is again shown. This secondary signal is to be placed a short distance to the west of the track-circuit closer, on the assumption that the train is to run from east to west, as before, for a purpose to be hereinafter explained.

The secondary signal S is actuated as follows: The lever or circuit-changer F is pivoted at $f^4$, and in its normal position is supported by the screw $f^1$, which rests upon the post *f*; but when the armature *m* has nearly completed its stroke, as hereinbefore explained, the extremity of the lever $m^2$ comes in contact with the screw $f^2$, forming an electrical connection at that point, and at the same time raising the lever F and breaking contact between *f* and $f^1$. The effect of this is to transfer the current of the battery E from the electro-magnet M to the electro-magnet N and the magnet of the secondary signal S, both of which latter are included in the same circuit.

The current will now take the path shown by the heavy lines in Fig. 4, which may be traced as follows: Commencing at the negative or — pole of battery E, thence through wire 4, post $c'$, lever *c*, wires 9 and 10, secondary signal S, wire 11, electro-magnet N, wires 12 and 7, lever F, screw $f^2$, and wire 13, to the positive or + pole of the battery.

The object of this arrangement of circuits is threefold: First, the cutting off of the current from the signal-magnet M before the completion of the stroke prevents the violent shock to the apparatus which would otherwise result from the greatly-increased attractive power exerted by the magnet at the end of the stroke, when the armature is nearly in contact with the poles, and the full power of the battery immediately becomes available for other purposes; second, the electro-magnet N is thrown into circuit, and the momentum of the disk G, after the circuit through M is broken, is sufficient to bring the lug or armature *n*, attached to its circumference, into contact with the magnet N, and the attractive force of the latter exerted upon the lug or armature *n* serves to firmly lock the signal-disk G in its new position, and at the same time to prevent any recoil or vibration; third, nearly the whole power of the battery E is transferred to the magnet of the secondary signal after the magnet of the primary signal has performed its office, and not otherwise, and the secondary signal thereby becomes an infallible indicator of the movements of the primary signal.

An alarm-bell or vibrator, P, operated or controlled by an electro-magnet, *p*, may be employed in connection with the primary signal, and operated by the same relay C and battery B. Upon closing the relay a branch circuit will be formed through the wires 4, 14, and 15, which will include the magnet *p*.

The manner in which the apparatus is operated by the passage of a locomotive or train will now be explained: When the front wheels and axle of the locomotive pass onto the circuit-closer formed by the insulated section of track *a a*, the signal-disk G is turned, as hereinbefore explained, and the targets H H displayed through the openings I I, indicating "danger" or "caution;" but as this signal is situated a train's length or more in advance of the track-circuit closer, the signal will not be displayed until the entire train has passed beyond the signal-box. The movement of the secondary signal S will, however, indicate to the engineer of the train whether or not the primary signal has been properly displayed in his rear.

I will here remark that the secondary signal should be so placed as to be in plain sight from the locomotive as it passes over and beyond the track-circuit closer *a a*.

During the time that the entire train is passing over the circuit-closer *a a* the apparatus will remain in the position last described; but when the last car has passed beyond it the circuit of the relay C, and consequently that of the electro-magnet N, and also that of the secondary signal S, will be broken, permitting the latter to return to its former position. It is necessary, however, that the primary signal should continue to indicate "danger" or "caution" until the train which displaced it has reached a certain point upon the road in advance, which point may be either a terminus or another signal-station, in order to warn any following train that the track upon that section is occupied.

I preferably cause the exhibition of this signal to be continued by simply allowing the armature *n* to come in direct and absolute contact with the poles of the electro-magnet N, and making use of the residual magnetism, which will thus remain in the cores and armature after the circuit is broken, to retain the armature, and consequently the signal-disk G, in position. It is generally preferable to make this armature of hardened steel, instead of the soft iron ordinarily employed for this purpose.

When the train reaches the next signal-point in the direction in which it is moving, it is made to release or reverse the signal, as follows: An insulated section of track, *b b*, Fig. 2, similar in all respects to *a a*, is provided. One rail is connected to the earth by the wire 16, and the other to a suitable battery, E′, by the wire 17. A wire, 18, from the other pole of the said battery, is extended in a direction parallel, or nearly so, with the line of railroad, to a point near the secondary signal S, where it is joined to the wire 11. This wire may be supported and insulated in the same manner as an ordinary telegraph-line. The distance between the points connected by the wire 18 is immaterial, and may be made greater or less, according to the distance that it is desired to preserve between trains following each other upon the track A A.

When the circuit at *b b* is closed a current from the battery E′ will traverse the wires 18 and 11, Figs. 1 and 4, magnet N, wires 12 and 7, lever F, screw $f^2$, wire 13, and wire 21, to the earth, returning through the earth and wires 16 and 17.

The battery E′ must be so placed that its current will traverse the magnet N in a direction opposite to that of the battery E, which will cause the current from E′ to neutralize or destroy the residual magnetism in N and release the armature *n*. The weight W will thereupon cause the signal-disk G to return to its original position, concealing the targets H H, and indicating to the engineer of the following train that he may proceed with safety.

Any other suitable arrangement of conductors to constitute a signal-reversing circuit, so arranged as to be closed by a passing locomotive or car—as, for instance, by the depression of a lever between or near the rails of the track—may be employed in lieu of the insulated section of track *b b*, because only a momentary current is required to release the armature *n* for permitting the signal to return to its normal position.

The weight W is adjustable upon a small spindle, *w*, and is placed upon the periphery of the signal-disk G. It should be sufficient to slightly overbalance the weight of the armature *n*, and to cause the signal to return to its original position when the attraction between N and *n* is destroyed. When placed upon the periphery of the disk in this manner, a very small weight is sufficient to accomplish this result, and much friction is thereby avoided.

In cases where there is a series of signals of this kind established I prefer to arrange the mechanism in such a manner that the displacing of any one primary signal will release or reverse the one next in order behind it. I do this by means of a circuit-closing spring-arm, T, attached to the lever $m^2$, but electrically insulated therefrom in any suitable manner. Whenever the signal is displayed the arm T is brought in contact with the screw-stud *t*, and a circuit established, either from the battery E, as shown in the drawings, or, if preferable, from a separate battery, through the wires 19 and 20, running back to the next signal in order and releasing it, in the manner hereinbefore described. It may be preferable in some cases to attach the arm T to the mechanism of the secondary signal, or to the relay-lever *c*. These variations, however, are immaterial. It is only essential that the train should be fully under the protection of one signal before the next one rearward is released or reversed, and therefore the releasing-current should not be transmitted until the locomotive has reached the circuit-closing point *a a*, which will insure the necessary protection by the signal rearward of the train.

It is sometimes preferable to operate the alarm D by a relay placed in the circuit of the wire 19 or 20, in which case the alarm will be caused to sound continually as long as the primary signal is displayed. In some cases it may also be preferable to arrange the signal-disk so that the danger-signal may be concealed by the action of the electro-magnet and displayed by the action of the counterbalancing-weight W; and this may be done without in any manner changing the general principle upon which the signal is operated. When the section of track *a a* is sufficiently well insulated for the purpose, it will sometimes be found more convenient to operate the electro-magnet M by placing it directly in the same circuit with the said insulated section *a a*, without the use of the relay C, in a manner well understood by those skilled in the art.

I here remark that I do not desire to confine myself to the particular device hereinbefore described for retaining the primary signal in position or action after the circuit is broken. Other devices may be employed for this purpose, such as a catch or latch acting upon the lug or armature *n*, which might be lifted by an additional magnet placed in the circuit of the wire 18; but I prefer the device herein described, as it is more simple in construction and less liable to get out of order than any other heretofore used.

I do not herein claim, in general, the use of the rails of a railroad-track as a portion of an electrical circuit for operating a signal; neither do I claim the devices shown for transmitting the motion of the armature *m* to the signal-disk G, nor the retaining of a signal in position after the circuit is broken by the force of residual magnetism, nor the method of releasing of the said signal by means of a current of reverse polarity, as these devices are all shown in my former United States Patents of July 16, 1872, No. 129,425, and August 27, 1872, No. 130,941. I furthermore make no claim to the method herein described of inclosing an electric signaling apparatus in a case with openings therein, through which the signals are exhibited.

I claim as my invention—

1. A visual or semaphoric signal and an electro-magnet for causing the same to be displayed or exhibited, in combination with a circuit-changer which is automatically brought into action by the movement of said signal, to interrupt or divert the electric current passing through said electro-magnet before the armature of said magnet has completed its movement, substantially as specified.

2. A visual or semaphoric signal, an electro-magnet for causing the same to be displayed or exhibited, and a circuit-closer so constructed and arranged as to remain continuously in action during the time occupied by a locomotive or train in passing a given point, in combination with a circuit-changer which is automatically brought into action by the movement of said signal, to interrupt or divert the electric current passing through said electro-magnet as soon as it has performed its office, substantially as specified.

3. A circuit-closer so constructed and arranged as to remain continuously in action during the time occupied by a locomotive or train in passing a given point, but no longer, thereby keeping the circuit of the signal-operating battery closed only during a corresponding period of time, and a signal-disk which is caused to be exhibited by the action of said battery upon an electro-magnet, in combination with a circuit-changer attached to said signal disk, or its operating mechanism, which shall automatically transfer the current of said battery to the controlling electro-magnet of a secondary visual signal immediately after it has actuated the primary signal, substantially as specified.

4. A primary and a secondary electro-magnetic signal, respectively included in and operated by a separate branch circuit from one and the same battery, in combination with a circuit-closer operated or controlled by a moving railway-train, and a circuit-changer automatically brought into action by the movement of the primary signal, whereby the current from the battery passing through the first-mentioned circuit-closer is diverted from the actuating or controlling electro-magnet of said primary signal, and allowed to act upon the corresponding electro-magnet of the secondary signal, so that the same battery may be successively employed to actuate the primary and the secondary signal.

5. A primary signal so constructed as to be placed in a position indicating "danger" or "caution," and a secondary signal so constructed as to indicate "safety," in each case by the action of an electric current upon an electro-magnet, in combination with a galvanic battery, and a circuit-changer for transferring the current of the said battery from one of the signal-operating magnets to the other in succession, substantially as specified.

6. The arrangement of the primary signal upon the line of a railroad at the distance of a train's length, or more, in the rear of the track-circuit closer which actuates the said signal, substantially as and for the purpose specified.

7. A circuit-closer so constructed and arranged as to remain continuously in action during the time occupied by a locomotive or train in passing a given point, but no longer, a signal-disk moved in one direction by the action of an electro-magnet under control of said circuit-closer, and in the other by that of a counter-balance, in combination with a lug secured to the said signal-disk, and acted upon by an independent holding or retaining device or power, whereby the said disk will be retained in position after the action of the locomotive or train upon the said circuit-closer or circuit has ceased, substantially as specified.

8. A movable signal-disk, in combination with an electro-magnet and an armature attached to the periphery of said disk, for locking the same in position by the action of residual magnetism after the electric current has been withdrawn from the actuating electro-magnet of said disk, substantially as specified.

9. A circuit-closer so constructed and arranged as to remain continuously in action during the time occupied by a locomotive or train in passing a given point, but no longer, a signal-disk moved in one direction by the action of an electro-magnet under control of said circuit-closer, and in the other by that of a counter-balance, in combination with mechanism for retaining or locking said disk against the action of its counter-balance after the action of the train upon said circuit-closer has ceased, and a device for unlocking or releasing said signal-disk by the action of an independent electric circuit and circuit-closer, substantially as specified.

10. A visual or audible signal which is caused to be displayed or sounded by the action of an electro-magnet, a device for releasing, reversing, or stopping said signal by the action of an electro-magnet, included in the circuit of a line-wire extending to the next signal point or station in advance, in combination with a circuit-closer attached to and operated by the mechanism of the primary or secondary signal at said advance station, and a circuit-closer for actuating said primary or secondary signal, placed at the distance of a train's length, or more, in advance of the signal, substantially as specified.

11. A semaphoric or visual signal controlled by an electro-magnet, and placed at a distance of a train's length, or more, in the rear of the track-circuit closer, which causes said signal to be actuated, in combination with a circuit-closer operated or controlled by the movements of said signals for releasing or reversing the next rearward signal of the series, substantially as specified.

12. A circuit-closer placed upon a railroad-track, and arranged to be operated by a moving train, in combination with the actuating electro-magnet of a semaphoric or visual signal, situated the distance of a train's length, or more, in the rear of said circuit-closer, and with the releasing or reversing electro-magnet of another signal, situated at the entrance of the next rearward section, substantially as specified.

FRANK L. POPE.

Witnesses:
T. J. KEANE,
A. J. DE LACY.